W. COOLEY.
MILK-PAN.

No. 184,062. Patented Nov. 7, 1876.

WITNESSES:
A. W. Almquist
John Goethals

INVENTOR:
Wm Cooley
BY
Munn
ATTORNEYS.

THE GRAPHIC CO. N.Y.

UNITED STATES PATENT OFFICE.

WILLIAM COOLEY, OF WATERBURY CENTRE, ASSIGNOR TO HIMSELF AND C. C. WARREN, OF WATERBURY, VERMONT.

IMPROVEMENT IN MILK-PANS.

Specification forming part of Letters Patent No. 184,062, dated November 7, 1876; application filed June 12, 1876.

*To all whom it may concern:*

Figure 1:
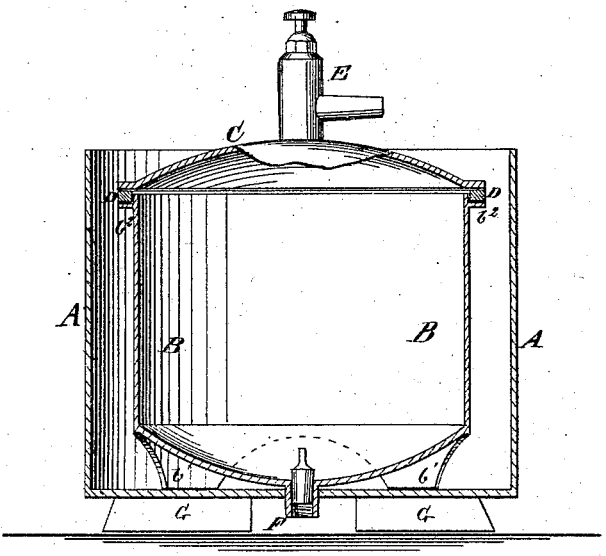
Figure 2:
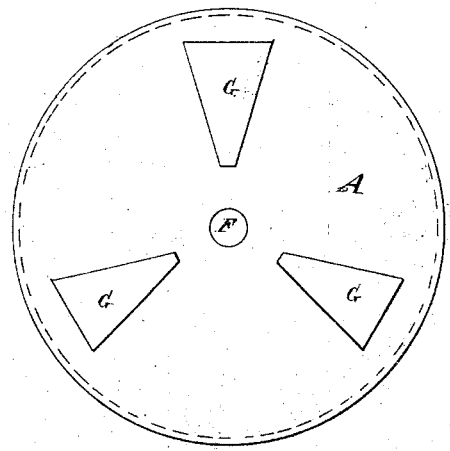

Be it known that I, WILLIAM COOLEY, of Waterbury Centre, in the county of Washington and State of Vermont, have invented a new and useful Improvement in Vacuum Milk-Pan, of which the following is a specification:

Figure 1 is a vertical section of my improved milk-pan. Fig. 2 is a bottom view of the same.

Similar letters of reference indicate corresponding parts.

The object of this invention is to enable the cream to be raised upon, and removed from, milk quickly and thoroughly, and without its being necessary to allow the milk to stand so long for the cream to rise, so that the skimmed milk may be sweet and good.

The invention consists in the combination of the pan provided with the curved bottom, the projecting edge, the discharge-tube, and the flange, the packing, the cover, the air-pump, and the outer pan with each other, as hereinafter fully described.

B is the pan in which the milk is placed. The sides of the pan project below the edge of the bottom, and are scalloped to form feet $b^1$ for the said pan to rest upon. The bottom of the pan A is made convex upon the lower side, and concave upon the upper side, the bulge being such that the center of the said bottom may rest upon the same support as the feet $b^1$. In the center of the bottom of the pan B is formed a small hole, in which is secured a short tube, F, through which the skimmed milk may be drawn off when desired.

The tube F may be closed with a plug or faucet, or other convenient means.

Around the upper edge of the pan B is formed a flange, $b^2$, to form a seat for a rubber packing, D, upon which the lower side of the edge of the cover C rests. In the center of the cover C is formed a hole, with which is connected an ordinary air-pump, E. The air-pump E should be detachably connected with the cover C, so that the same pump can be used with a number of pans. The pan B is placed in a pan, A, which is made a little larger than the pan B, so that there may be a space between the sides and bottoms of the two pans, except the small place where the middle parts of their bottoms come together. The discharge-tube F passes out through a hole in the bottom of the pan A.

In using apparatus, the milk is put into the pan B, the cover C is put on, the air-pump E is applied and the air is pumped out, forming vacuum above the milk.

By thus removing the pressure of the air from the milk the cream will rise much more quickly and much more thoroughly than where the milk is set for the cream to rise in the usual way.

After the air has been pumped out, water may be poured into pan A around the pan B. The pan A has feet G attached to its bottom to support the bottom of the pan A away from the bench or shelf to allow the air to circulate beneath it.

Having thus described my invention, I claim as new and desire to secure by Letters Patent—

The pan B, provided with the curved bottom, the projecting edge $b^1$, the discharge-tube F, the flange $b^2$, and the packing D, with the cover C, the air-pump E, and the outer pan A, all arranged substantially as herein shown and described.

WM. COOLEY.

Witnesses:
CURTIS WELLS,
P. G. WRIGHT.